(12) United States Patent (10) Patent No.: US 8,077,919 B2
Gupta et al. (45) Date of Patent: Dec. 13, 2011

(54) TORO: TRACKING AND OBSERVING ROBOT

(75) Inventors: Rakesh Gupta, Mountain View, CA (US); Deepak Ramachandran, Champaign, IL (US)

(73) Assignee: Honda Motor Co., Ltd., Tokyo (JP)

(*) Notice: Subject to any disclaimer, the term of this patent is extended or adjusted under 35 U.S.C. 154(b) by 699 days.

(21) Appl. No.: 12/249,849

(22) Filed: Oct. 10, 2008

(65) Prior Publication Data

US 2009/0147994 A1 Jun. 11, 2009

Related U.S. Application Data

(60) Provisional application No. 60/979,062, filed on Oct. 10, 2007, provisional application No. 60/985,577, filed on Nov. 5, 2007, provisional application No. 61/015,510, filed on Dec. 20, 2007, provisional application No. 61/025,636, filed on Feb. 1, 2008.

(51) Int. Cl.
*G06K 9/00* (2006.01)
*G06F 11/00* (2006.01)

(52) U.S. Cl. .................... 382/103; 382/291; 702/188

(58) Field of Classification Search .................. 382/100, 382/103, 106, 107, 153, 154, 155, 165, 168, 382/173, 181, 191–195, 199, 203, 219, 220, 382/224, 232, 254, 274, 276, 287–291, 305, 382/312; 342/95; 706/24, 45; 702/150, 702/188
See application file for complete search history.

(56) References Cited

U.S. PATENT DOCUMENTS

| 3,952,304 | A | * | 4/1976 | Broniwitz et al. | 342/95 |
| 4,179,696 | A | | 12/1979 | Quesinberry et al. | |
| 5,613,039 | A | * | 3/1997 | Wang et al. | 706/24 |
| 6,882,959 | B2 | | 4/2005 | Rui et al. | |

(Continued)

FOREIGN PATENT DOCUMENTS

WO WO 2004/095056 11/2004

OTHER PUBLICATIONS

PCT International Search Report and Written Opinion, PCT/US2008/079652, Jan. 30, 2009, 8 Pages.
Ryu, H., "Multiple Object Tracking Using Particle Filters" The University of Texas at Arlington, Aug. 2006, 90 Pages.
Montemerlo, M., et al., "A Factored Solution to the Simultaneous Localization and Mapping Problem," Proceedings of the AAAI National Conference on Artificial Intelligence, 2002, pp. 593-598.

*Primary Examiner* — Seyed Azarian
(74) *Attorney, Agent, or Firm* — Fenwick & West LLP; Mark E. Duell

(57) ABSTRACT

The present invention provides a method for tracking entities, such as people, in an environment over long time periods. A region-based model is generated to model beliefs about entity locations. Each region corresponds to a discrete area representing a location where an entity is likely to be found. Each region includes one or more positions which more precisely specify the location of an entity within the region so that the region defines a probability distribution of the entity residing at different positions within the region. A region-based particle filtering method is applied to entities within the regions so that the probability distribution of each region is updated to indicate the likelihood of the entity residing in a particular region as the entity moves.

16 Claims, 7 Drawing Sheets

U.S. PATENT DOCUMENTS

| | | | |
|---|---|---|---|
| 6,912,475 B2 * | 6/2005 | Moriya et al. | 702/150 |
| 7,809,661 B2 * | 10/2010 | D'Ambrosio | 706/45 |
| 2004/0013295 A1 * | 1/2004 | Sabe et al. | 382/153 |
| 2005/0185834 A1 * | 8/2005 | Kristjansson et al. | 382/154 |
| 2006/0182348 A1 * | 8/2006 | Kinjo | 382/203 |
| 2007/0219754 A1 * | 9/2007 | D'Ambrosio | 702/188 |

* cited by examiner

— TORO: TRACKING AND OBSERVING ROBOT —

RELATED APPLICATIONS

This application claims priority, under 35 U.S.C. §119(e), from U.S. provisional application No. 60/979,062, filed on Oct. 10, 2007, U.S. provisional application No. 60/985,577, filed on Nov. 5, 2007, U.S. provisional application No. 61/015,510, filed on Dec. 20, 2007, and U.S. provisional application No. 61/025,636, filed on Feb. 1, 2008, which are incorporated by reference herein in their entirety.

FIELD OF THE INVENTION

This invention relates generally to entity tracking, and more particularly to a system and method for using a region-based hierarchical model to locate entities.

BACKGROUND OF THE INVENTION

Mobile robots have been deployed in multiple types of environments including one or more people, such as offices and hospitals. Such robots can provide assistance in home, office and medical environments, but need to verbally and physically interact with people in the environment. For example, a robot can verbally provide information or physically retrieve an object to aid one or more people in the environment.

However, to effectively interact with people and perform tasks, it is desirable for a robot to model the location of people and other task-related entities in its surrounding environment. Tracking entities, such as people, allows the robot to plan efficient sequences of actions for accomplishing given tasks. Conventional methods for entity tracking have concentrated on tracking movement of people in the immediate vicinity of the robot over short time periods using lasers and radio frequency identification ("RFID") sensors.

These conventional methods, however, focus on short-term entity tracking and are unable to track an entity after the entity leaves the robot's field of view. Further, the use of lasers prevents these conventional methods from differentiating people from other objects or obstacles in the environment. Additionally, large-scale use of RFID sensors is impractical. Hence, conventional methods merely allow robots to track entities for short time intervals.

Thus, what is needed is a system and method for tracking entities over extended time intervals.

SUMMARY OF THE INVENTION

The present invention provides a system and method for tracking entities, such as people, in an environment over long time periods. A plurality of regions specifying discrete areas where entities can reside are generated. Each region defines one or more parametres, such as positions included within the region, which more precisely specify the location of an entity within the region. Thus, a region defines a probability distribution of the likelihood of an entity residing at different positions within the region. For example, the positions are Cartesian coordinates and the region specifies a Gaussian distribution with a two-dimensional mean vector and covariance matrix describing the likelihood of the entity residing at positions within the region. As an image capture device obtains image data associated with the entity, the probability distributions of each region are updated responsive to changes in the entity position. Thus, as the entity moves within or between regions, the probability distribution of each region is modified to represent the current likelihood of the entity being located within a region.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
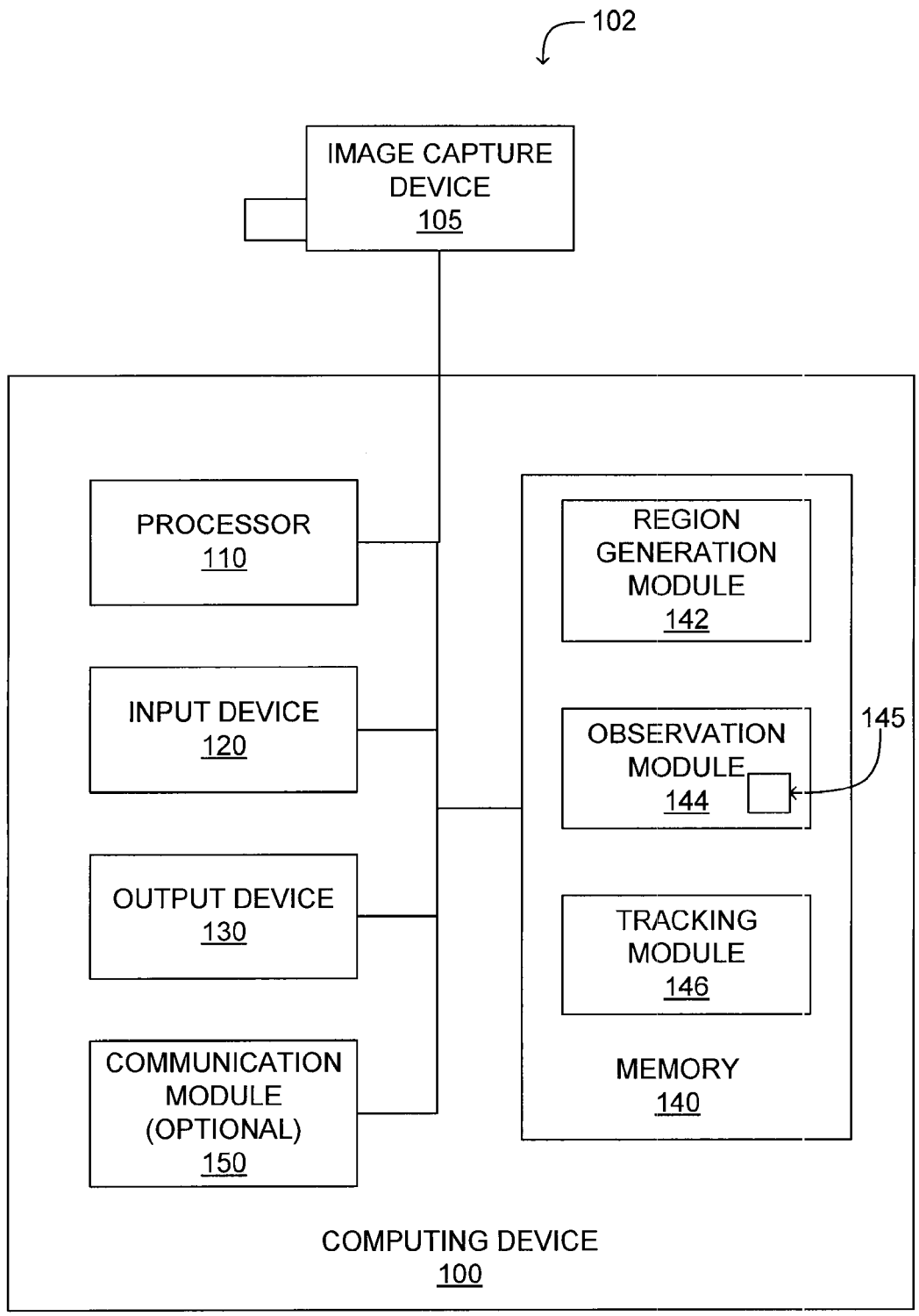
FIG. 1 is an illustration of a computing system in which one embodiment of the present invention operates.

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computing system 102 in which one embodiment of the present invention may operate. The computing system 102 includes a computing device 100 and an image capture device 105. The computing device 100 comprises a processor 110, an input device 120, an output device 130 and a memory 140. In an embodiment, the computing device 100 further comprises a communication module 150 including transceivers or connectors.

An image capture device 105, such as a video camera, video capture device or another device capable of electronically capturing movement, captures data, such as image or other positional data, describing the movement of an entity, such as a person, and transmits the captured data to the computing device 100. In an embodiment, the image capture device 105 is a combined depth/vision camera apparatus, such as the CSEM depth camera, where the depth apparatus captures the presence and coordinates of entities in the visual field of the image capture module 105 and the vision apparatus distinguishes between different entities observed by the image capture device 105. In one embodiment, the image capture device 105 distinguishes people from other types of detected entities by using depth information from the depth apparatus, or communicating the depth information to the processor 110, to build horizontal and vertical contour lines of continuous depth. The horizontal and vertical contour lines are used as features for a person recognizer which is trained using logistic regression to return the maximum likelihood estimate of the coordinates of a person observed by the image capture device 105. Although described above with reference to detecting a person, data from the depth apparatus may also be used to recognize other types of entities. In an embodiment, the vision apparatus is used to distinguish between individual people and objects, for example, by using clothing color to distinguish between different people. The captured image data is communicated from the image capture device 105 to the computing device 110, which processes the captured image data to track one or more entities.

The processor 110 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computing device 100 such as, a cursor controller or a keyboard. In one embodiment, the input device 120 can include an alphanumeric input device, such as a QWERTY keyboard, a key pad or representations of such created on a touch screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM or other non-volatile storage device, combinations of the above, or some other memory device known in the art. The memory 140 comprises a region generation module 142, an observation module 144 and a tracking module 146, and is adapted to communicate with the processor 110, the input device 120, the output device 130 and/or the communication module 150.

The region generation module 142 includes information describing generation and modification of a region-based model of entity location and computing system 100 position. In one embodiment, the region generation model describes a Dynamic Bayesian Network (DBN) which initially selects a region, and then selects a position, such as a Cartesian coordinate, within the region associated with an entity. For example, the region is a discrete variable and the position is a linear Gaussian conditional on the discrete variable. In an embodiment, the generated regions correspond to locations in an environment where people typically stop and stay for an extended period of time, such as the area in front of a desk, the area in front of a printer, the area in front of a water cooler or similar locations. In addition to describing regions and positions, the region generation module 142 also includes a transition model describing motion of an entity between regions and between positions within a region. In an embodiment, the transition model included in the region generation module 142 models the behavior of position variables within a region using Brownian motion assuming a Gaussian kernel density with a small base relative to the scale of the region around the current position. Similarly, when an entity transitions from a first region to a second region, the transition model determines the entity position in the second region using parameters associated with the second region.

The observation module 144 includes instructions for determining the probability of observing an entity and localizing the position of the computing system 102. To determine the probability of entity observation, the observation module 144 includes data for calculating observation probability for different cases: when an entity is observed in the visual field of the image capture device 105 and when an entity is not observed in the visual field of the image capture device 105. Calculation of entity observation probability performed by the observation module 144 is further described below in conjunction with FIG. 4.

Additionally, the observation module 144 includes data for determining the position of the computing system 102. In one embodiment, the observation module 144 includes a localization module 145 which includes the instructions for determining the position of the computing system 102. For example, the observation module 144 describes how to localize the position of a robot including the computing system 102. In one embodiment, the observation module 144 describes a modified form of Monte Carlo localization where particle filters maintaining a guess of the path taken by the computing system 102 through an environment, such as the FastSLAM method described in "A Factored Solution to the Simultaneous Localization and Mapping Problem" by M. Montemerlo et al. in Proceedings of the AAAI National Conference on Artificial Intelligence, which is incorporated by reference herein its entirety. A localization method included in the observation module is further described below in conjunction with FIG. 2.

The tracking module 146 includes data describing how to track the posterior distribution of entity locations. In one embodiment, the tracking module 146 describes a region based particle filter where each particle includes a region variable and a position variable. The tracking module 146 also computes a weight for each particle indicating the probability of the current observation based on the hypothesis that the entity is at a position and region specified by a particle. Each region is then resampled by the tracking module 146 so that the total weight of a specific region equals the total weight of the particles included in the specific region to keep the probability mass of each region tightly controlled. By using this particle-specific weighting, the transition model described by the region generation module 142 regulates modeling of transitions of entities between regions so that the discrete probabilities of an entity being located in a specific region are accurate, even if there are errors in the distribution of positions within the specific region. A method of tracking entities by the tracking module 146 is further described in conjunction with FIG. 5.

In an embodiment, the computing device 100 further comprises a communication module 150 which links the computing device 100 to a network (not shown), or to other computing devices 100. The network may comprise a local area network (LAN), a wide area network (WAN) (e.g. the Internet), and/or any other interconnected data path across which multiple devices man communicate. In one embodiment, the communication module 150 is a conventional connection, such as USB, IEEE 1394 or Ethernet, to other computing devices 100 for distribution of files and information. In another embodiment, the communication module 150 is a conventional type of transceiver, such as for infrared communication, IEEE 802.11a/b/g/n (or WiFi) communication, Bluetooth® communication, 3G communication, IEEE 802.16 (or WiMax) communication, or radio frequency communication.

It should be apparent to one skilled in the art that computing device 100 may include more or less components than those shown in FIG. 1 without departing from the spirit and scope of the present invention. For example, computing device 100 may include additional memory, such as, for example, a first or second level cache, or one or more application specific integrated circuits (ASICs). Similarly, computing device 100 may include additional input or output devices. In some embodiments of the present invention one or more of the components (110, 120, 130, 140, 142, 144, 146) can be positioned in close proximity to each other while in other embodiments these components can be positioned in geographically distant locations. For example the units in memory 140 can be programs capable of being executed by one or more processors 110 located in separate computing devices 100.

Figure 2:
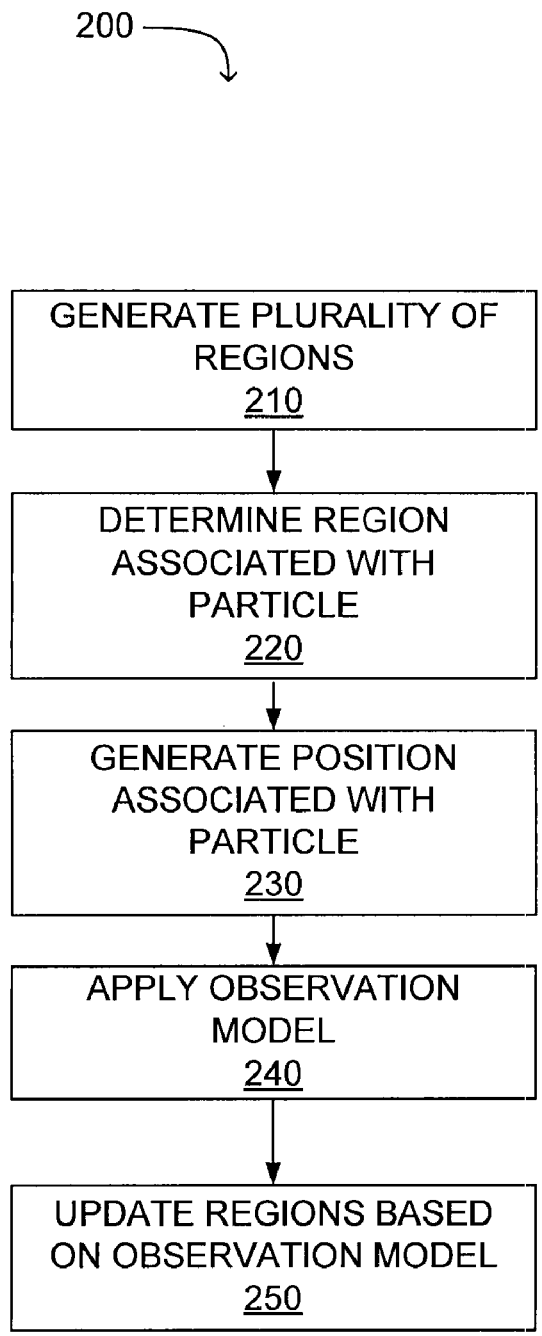
FIG. 2 is a flowchart illustrating a method for region-based entity tracking according to one embodiment of the present invention.

FIG. 2 is a flowchart illustrating a method 200 for region-based entity tracking according to one embodiment of the present invention. In an embodiment, the steps of the method 200 are implemented by the microprocessor 110 executing software or firmware instructions that cause the described actions. Those of skill in the art will recognize that one or more steps of the method may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 2 in different orders. Moreover, other embodiments can include different and/or additional steps than the ones described here.

Initially, a plurality of regions are generated 210 by the region generation module 142. In an embodiment, the plurality of regions form a Dynamic Bayesian Network (DBN) having a layer of discrete region variables representing common locations where entities, such as people, reside, such as a location proximate to a desk or a location proximate to a water cooler. Each region specifies a probability distribution over the precise position of an entity within a region. In an embodiment, a two-dimensional mean vector, $\mu_r$ and a 2×2 covariance matrix $\Sigma_r$ are associated with each region. Each region includes a plurality of position variables which more precisely specify the location of an entity. For example, the position variables comprise Cartesian coordinates, such as $(x_r, y_r)$ specifying the location of an entity within a region. Hence, the position, $X_t = (x_r, y_r)$ for each entity in a region, R, is drawn from the Gaussian distribution having parameters $(\mu_r, \Sigma_r)$, so that $X_t \sim N(\mu_r, \Sigma_r)$. Additionally, in the generated DBN, the position of the computing system 102 is defined by an $(x, y, \theta)$ tuple, where $\theta$ indicates the direction the image capture device 105 is facing, which allows translation of observed data into absolute coordinates. For example, if the computing system 102 is included in a robot, the robot pose is specified by the $(x, y, \theta)$ tuple. For example, the regions As the plurality of regions are generated 210, a corresponding transition model is also generated. The transition model represents movement by an entity within a region by moving from position to position and movement by an entity between regions. In an embodiment, the dynamic behavior of movement between positions in a region is modeled by Brownian motion. For example, a Gaussian kernel density with a small base centered at the current position of an entity is generated. When the DBN is updated, a new position of the entity is chosen based on the Gaussian kernel density and accepted according to the Gaussian distribution associated with the current region (e.g., the Gaussian distribution having parameters $(\mu_r, \Sigma_r)$). Hence, the equilibrium distribution of the position data converges on a slow Markov chain back to the region's prior distribution. This distribution models the expected behavior of an unobserved entity, namely that the entity remains in the current region, but if unobserved can occupy one of many positions in the region as described by the region's prior probability distribution.

The transition model also describes transitions of an entity between different regions. At a given time, there is a small probability associated with an entity transitioning from a first region to a second region. When an entity transitions from a first region to a second region, the position of the entity in the second region is drawn from the Gaussian prior distribution for the second region. For example, an entity has position $X_t$ in region r at time t, and transitions into region r' at time t+1. The entity position in region r' at time t+1 is modeled using the Gaussian distribution associated with region r' at time t.

After the regions and transition model have been generated 210, the region associated with a particle identifying an entity is determined 220 and the position of the particle within the determined region is subsequently determined 230. For example, the transition model generated 210 in addition to the plurality of regions is applied to one or more particles each representing an entity. If application of the transition model indicates that a particle has moved from a first region to a second region, the probability distribution associated with the second region is used to determine 230 the particle's new position in the second region.

An observation model is then applied 240 to the particle associated with an entity to determine the probability of observing the particle in different regions and different positions within a region. In applying 240 the observation model, the observation module 144 determines whether the entity has been observed by the image capture device 105 and calculates the probability of observing the entity in each of the generated regions. As the observation model is applied, the observation module 144 also determines the position of the computing system 102, as this position affects the subsequent entity tracking by the tracking module 146 to update 250 each region. An example of this observation and probability calculation is further described in conjunction with FIG. 4.

Responsive to application of the observation model, the tracking module 146 updates 250 weights associated with one or more particles within each of the generated regions. The tracking module 146 modifies the probability distribution associated with each region responsive to application of the observation module so that the probability distribution of each region reflects the likelihood of an entity currently being in a particular region. Each region is updated 250 so that the total weight of the particles in a region equals the total weight of a region to tightly regulate the probability mass of each region. Hence, the transition model of the generated regions regulates modification of each region's probability mass so that the probability mass of each discrete region accurately indicates the likelihood of finding the entity in each region.

Figure 3:
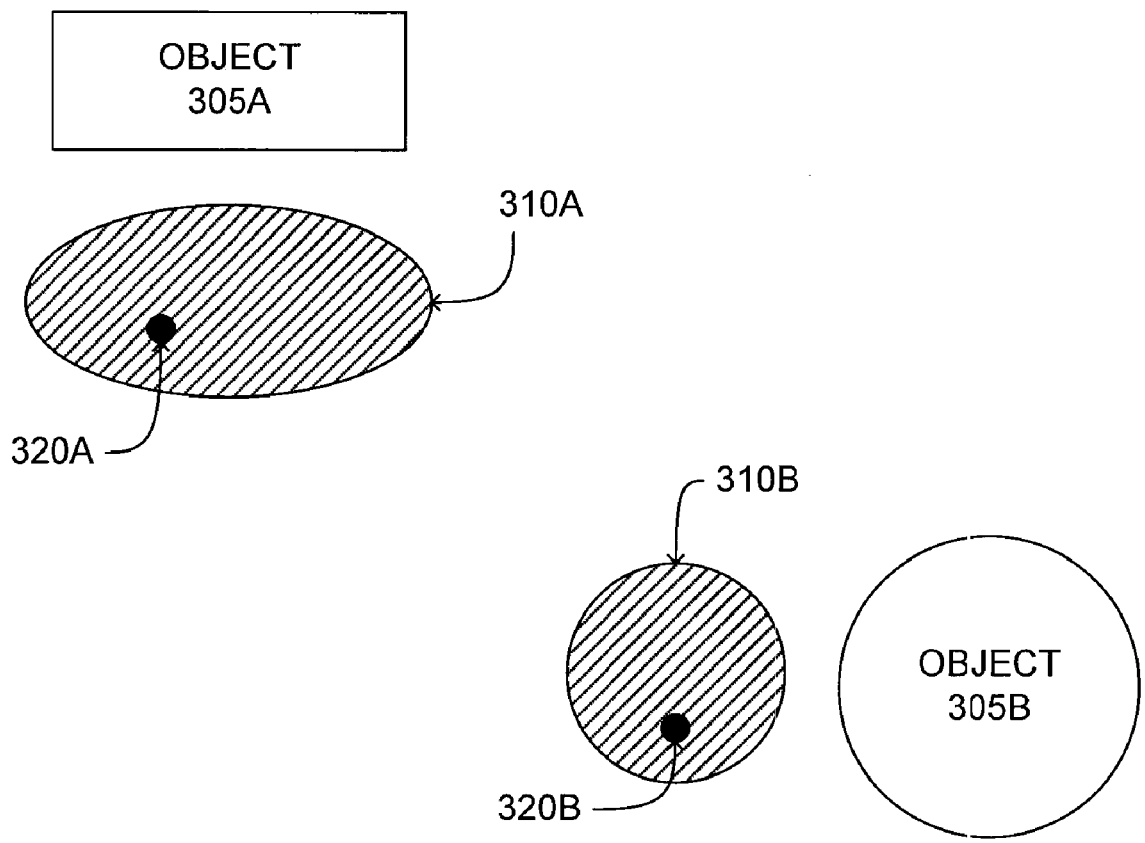
FIG. 3 is an example of a region-based representation of an environment according to one embodiment of the present invention.

FIG. 3 is an example of a region-based representation of an environment according to one embodiment of the present invention. In an embodiment, the computing system 102 is initially configured with the floor plan of the environment surrounding the computing system 102. The floor plan describes the location of different objects, such as walls, doors, desks, chairs and other objects. For example, the floor plan of an office describing the relative location of different rooms and objects in each room building is initially stored in the region generation module 142 of the computing system 102. In addition to initially receiving a description of the surrounding environment, the computing system 102 also receives data describing the possible locations of entities in the environment. For example, the computing system 102 receives data indicating approximations of the likelihood of entities being proximate to different objects in the environment. In one embodiment, these initial approximations assign an equal likelihood of an entity being proximate to various objects in the environment. Alternatively, the initial approximations assign different likelihoods of an entity being proximate to different objects based on prior data describing similar environments or prior data describing the current environment.

In the example shown in FIG. 3, a first object 305A and a second object 305B from the initial description of the computing system 102 environment are shown for clarity. In other embodiments, more or fewer objects are included in the description of the environment surrounding the computing system 102. After the region generation module 142 identifies the first object 305A and the second object 305B from the received environment data, a region is generated associated with each object. Hence, a first region 310A is generated and associated with the first object 305A and a second region 310B is generated and associated with the second object 305B. Each of the regions defines a distribution over the position of an entity proximate to the object. Hence, the first region 310A describes a probability distribution of an entity being proximate to the first object 305A and the second region 310B indicates a probability distribution of an entity being proximate to the second object 305A. A two-dimensional mean vector, $\mu_r$ and a 2×2 covariance matrix $\Sigma_r$ are associated with each region and specify the characteristics of a Gaussian distribution associated with each region. The region-specific Gaussian distribution is used to determine the position of an entity with the region.

While the regions define regions where an entity is likely to reside, a position within the region more precisely indicates the location of an object within a region. Parameters of the position are dependent on characteristics of the region, such as the two-dimensional mean vector, $\mu_r$, and the 2×2 covariance matrix $\Sigma_r$, associated with each region. FIG. 3 shows the position of an entity within the first region 310A and the second region 310B. The first position 320A indicates the location of an entity within the first region 310A. The first position 320A comprises a variable drawn from the Gaussian distribution associated with the first region 31 OA, so the two-dimensional mean vector, $\mu_r$, and a 2×2 covariance matrix $\Sigma_r$, associated with the first region 310A. Similarly, the second position 320B comprises a variable drawn from the Gaussian distribution associated with the second region 310B, so the two-dimensional mean vector, $\mu_r$, and a 2×2 covariance matrix $\Sigma_r$, associated with the second region 310B.

In one embodiment, the region-based representation of entity location is implemented using a Dynamic Bayesian Network (DBN), which allows division of entity location information into two parts—one for modeling and another for decision-making. By using both a region and a position within a region to model entity position, entity transitions occurring at different time scales are separated into different layers of the entity position model, improving entity tracking over extended time intervals. For example, movement within a specific region can be modeled using the Gaussian distribution associated with the specific region, simplifying entity tracking within a region. Additionally, region based information may simplify decision-making using information about the larger region which includes an entity rather than exact information about the precise location of an entity. Further, the use of discrete regions allows entity tracking to be performed on a per-region basis, allowing for more efficient and accurate tracking than a conventional particle filter.

Figure 4:
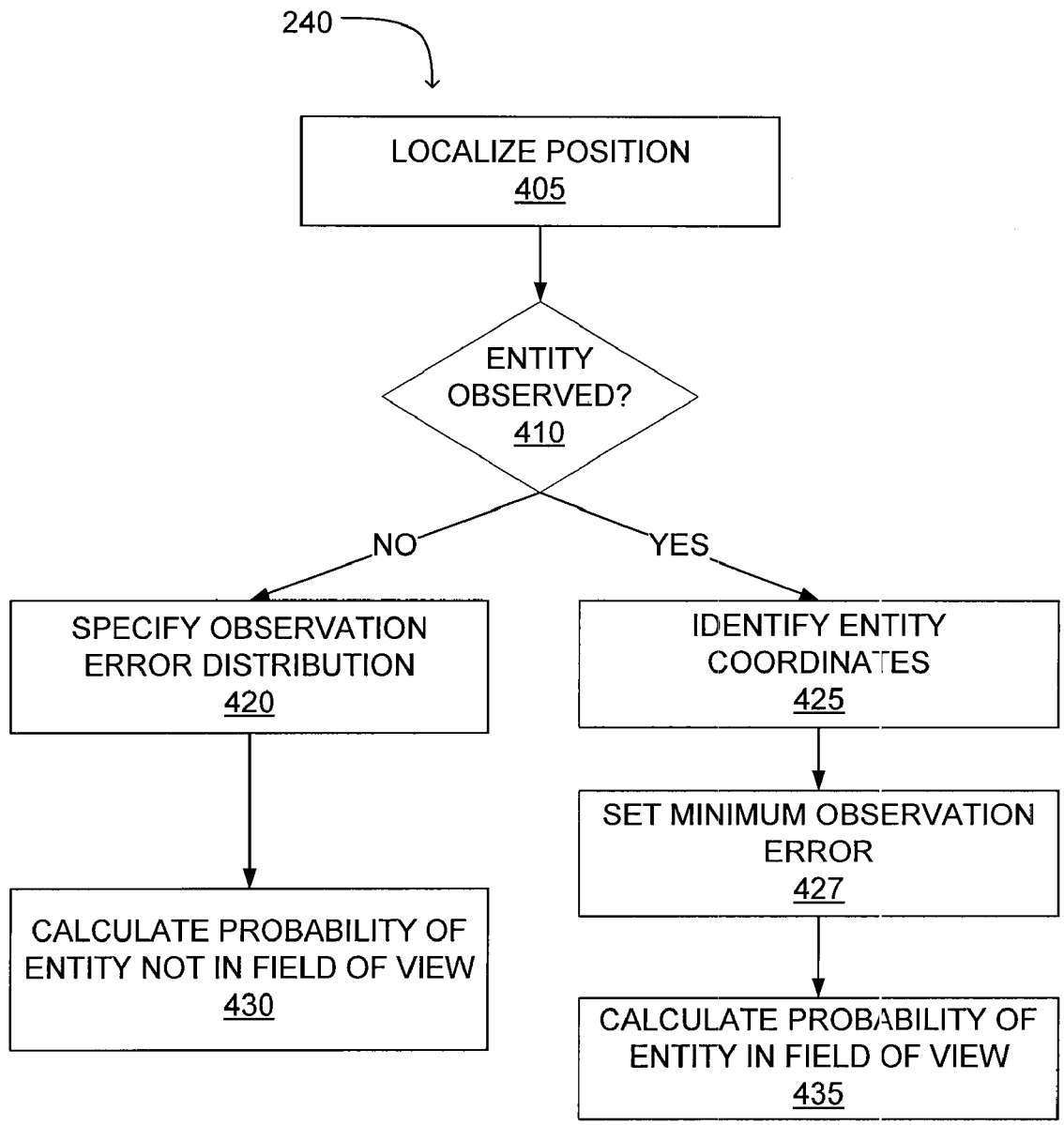
FIG. 4 is a flowchart illustrating a method for determining the probability of observing an entity in one or more regions according to one embodiment of the present invention.

FIG. 4 is a flowchart illustrating a method for determining the probability of observing an entity in one or more regions according to one embodiment of the present invention. Hence, FIG. 4 shows one embodiment of applying 240 an observation model to one or more regions responsive to data from the image capture device 105.

Initially, the observation module 144 localizes 405 the position of the image capture device 105. For example, if the image capture device 105 is included in a mobile robot, localization 405 determines the position of the mobile robot. Localizing 405 the position of the image capture module 105 improves the entity tracking further described in conjunction with FIG. 5 by using conditional interdependencies from the localization process.

In one embodiment, a modified form of Monte Carlo Localization, such as the FastSLAM method described in "A Factored Solution to the Simultaneous Localization and Mapping Problem" by M. Montemerlo et al. in Proceedings of the AAAI National Conference on Artificial Intelligence, which is incorporated by reference herein in its entirety, allows particle filters to be applied to localization. In an embodiment where the FastSLAM localization method is applied, a particle associated with an entity maintains an approximation of a path taken by the image capture device 105 through the environment. Hence, the set of particles at a particular time t is represented by:

$$S_t = \{s^{t,[m]}\} m = \{(s_1^{[m]}, s_2^{[m]}, \ldots, s_t^{[m]})\} m$$

Where the superscript [m] identifies the $m^{th}$ particle and the superscript t identifies the set of variables from time 1 to time t. St is computed recursively from the set of particles at the prior time interval, $S_{t-1}$ using a Bootstrap algorithm, such as the algorighm described in "A Factored Solution to the Simultaneous Localization and Mapping Problem" by M. Montemerlo et al. in Proceedings of the AAAI National Conference on Artificial Intelligence, which is incorporated by reference herein in its entirety. In an embodiment, a candidate pose at time t for each particle $s^{t-1,m}$ is generated from the probabilistic motion model:

$$q_t^{[m]} \sim p(\cdot|u_t, s_{t-1}^{[m]})$$

Where $u_t$ is the control at time t and the new pose $q_t^{[m]}$ is appended to the set of poses included in $s^{t-1,m}$ and the resulting particles are stored in a temporary set T. Each particle in the temporary set T is weighed by an importance factor calculated using:

$$w_t^{[m]} = \frac{p(q^{t,[m]} | z^t, u^t)}{p(q^{t,[m]} | z^{t-1}, u^t)}$$

Where $z^t$ denotes the observations made from time 1 to the current time, t. $S_t$ is then computed by sampling from the temporary set T weighted by the importance factors. Thus, if $S_{t-1}$ is distributed according to $p(s^{t-1,[m]}|z^{t-1},u^{t-1})$ then $S_t$ is drawn from $p(s^{t,[m]}|z^t,u^t)$. The set of particles at the current time can be calculated using the pose estimate from the prior time $(s_{t-1})$ without additional information, conserving storage resources by allowing pose estimates from earlier times to be discarded.

The observation module 144 then determines 410 whether an entity has been observed by the image capture device 105. For example, depth information from the image capture device 105 is used to form horizontal and vertical contour lines which are used as features for an entity recognizer trained using logistic regression. The entity recognizer generates a maximum likelihood estimate for coordinates of an entity, the observation module 144 determines 410 that an entity has been observed in the field of view of the image capture device 105. If no coordinate estimates are returned, the observation module determines 410 that an entity has not been observed in the field of view of the image capture device 105. In one embodiment, the observation module 144 modifies an observation variable $O_t$ having the form $(O_t^I, O_t^X)$ when determining 410 whether an entity has been observed. $O_t^I$ is an indicator variable which has the value of 1 when an entity is observed by the image capture device 105 and a value of 0 when an entity is not observed by the image capture device 105. If $O_t^I$ indicates an entity is observed, then $O_t^X$ is configured to the coordinates of the observed entity provided by the image capture device 105.

Figure 6A:
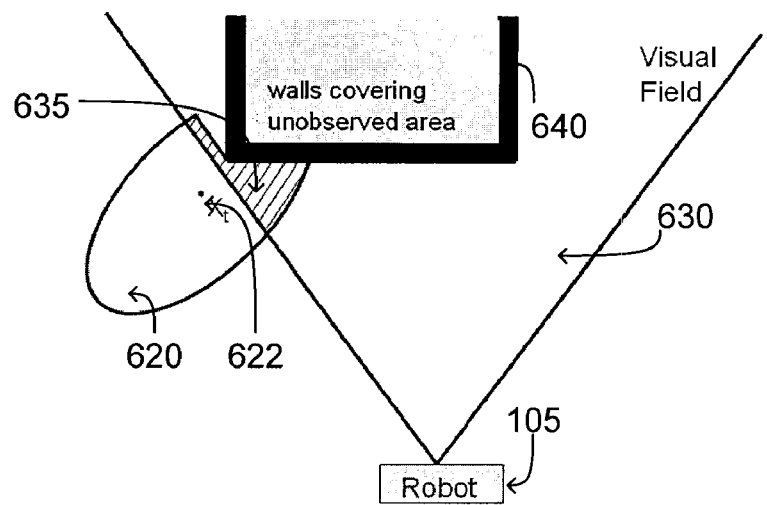
FIGS. 6A and 6B are examples of using observation data to determine the probability of observing an entity in a region according to one embodiment of the present invention.
Figure 6B:
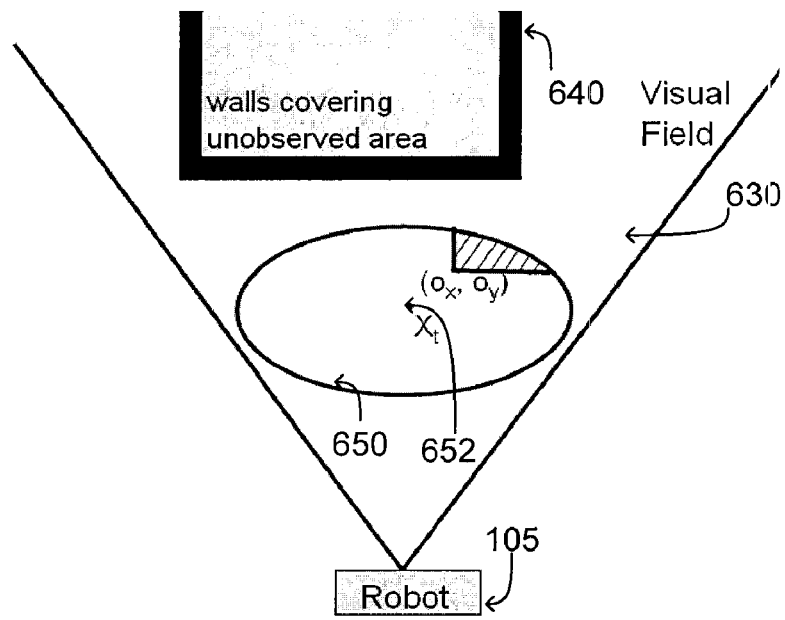

To further clarify application 240 of the observation module when an entity is detected and when an entity is not detected, reference to FIGS. 6A and 6B is made in addition to FIG. 4. FIG. 6A is an example where an entity 622 is not within the field of view of the image capture device 105 while FIG. 6B is an example where an entity is within the field of view of the image capture device 105. Thus, FIG. 6A illustrates an example scenario where the observation module 144 determines 410 an entity is not observed by the image capture device 105 and FIG. 6B illustrates an example scenario where the observation module 144 determines 410 an entity is observed by the image capture device 105.

If the observation module 144 determines 410 that an entity is not observed by the image capture device 105, the probability distribution of not observing an entity in the current visual field 630 of the image capture device 105 is specified 420. In an embodiment, the error associated with observing an entity 622 at a position $X_t=(x_t,y_t)$ is specified 420 as a Gaussian distribution centered at $X_t$ with a covariance matrix of $\Sigma_{obs}$. The covariance matrix is rotated so that the principal axes of the Gaussian distribution are oriented along the normal and perpendicular from the image capture device 105 to the position of the entity 622. Hence, the probability of not observing the entity in the current visual field 630 of the image capture device is specified 420 by:

$$Pr[O_t = (0_1 -) | X_t] = 1 - \int_A N(x; X_t, \Sigma_{obs}) dx$$

Where A denotes a portion 635 of the region 620 including the entity 622 within the visual field 630 that is not occluded and $N(x; X_t)$ represents the Gaussian distribution having a mean of $X_t$ and a covariance of $\Sigma_{obs}$. The specified probability distribution is used to calculate 430 the probability of the entity 622 being observed in a region, or portion of a region, outside of the visual field 630 of the image capture device 105.

As shown in FIG. 6A, the visual field 630 may include one or more obstructions 640, such as walls or other opaque objects, which prevent the image capture device 105 from viewing regions within the visual field 630. For example, the image capture device 105 is unable to observe the portion of the visual field 630 region behind obstructions 640. Hence, the obstructions 640 may prevent the image capture device 105 from viewing a portion of region 620, or other regions, so the probability of not observing the entity in the current visual field 630 accounts for the areas of the region 620 including the entity 622 that are occluded. In an embodiment, the depth of the obstructions 640 is obtained by a range-finder, such as a laser range-finder, that communicates with the image capture device 105 or is included in the image capture device 105. In one embodiment, to simplify calculation of the unobscured portion 635 of the region 620, one dimensional integration of the points of unobscured portion 635 along the major principal axis perpendicular to the position of the image capture device 105 is performed.

If the observation module 144 determines 410 that an entity is observed by the image capture device 105, the coordinates of the observed entity are identified 425 from the image capture device 105. In one embodiment, the observation module 144 modifies the observation variable $O_t$ responsive to the image capture device 105 observing an entity. For example, the $O_t^I$ indicator variable of the observation variable is set to the value of 1 and the $O_t^X$ component of the observation variable configured to the coordinates of the observed entity provided by the image capture device 105. For example, the O component is specified as Cartesian coordinates associated with the entity observed by the image capture device 105. In the example shown in FIG. 6B, as an object 652 is within a region 650 included in the visual field 630 of the image capture device 105, so the observation variable is set to $O_t = (1, (o_x, o_y))$.

So that calculation of the probability of the entity being within the field of view of the image capture device 105 is comparable to calculation of the probability of the entity not being within the field of view of the image capture device 105, the minimum observation error is set 427 by the observation module 144. Because evaluating the Gaussian distribution of the region at the coordinates of the observation makes the probability asymmetrical with respect to the calculation when the entity is not within the visual field, the minimum observation error is set 427 to $\|o_x - x_t, o_y - y_t\|$. Where $(o_x, o_y)$ are the coordinates of the observation point and $(x_t, y_t)$ are the coordinates of the entity. By setting 427 the minimum observation error, the probability of observing the entity in the visual field 430 is calculated 435 using:

$$Pr(O_t = (1, (o_x, o_y)) | X_t = (x_t, y_t)) = (erf(|x - x_t| > |o_x - x_t|, |y - y_t| > |o_u - y_t|; (x_t, y_t), \Sigma_{obs})$$

Where "erf" denotes the error function, which is the cumulative distribution function of a Gaussian distribution. Hence, the probability that the entity is in a region 650 within the visual field 630 of the image capture device 105 is area of the Gaussian distribution having a mean of $X_t$ and a covariance of $\Sigma_{obs}$ bounded by the observed position. As calculating 435 the probability of the entity being observed by the image capture device 105 involves calculating the cumulative distribution function described by the region 650 including the entity 652, obstructions 640 in the visual field do not complicate the probability calculation 435.

Figure 5:
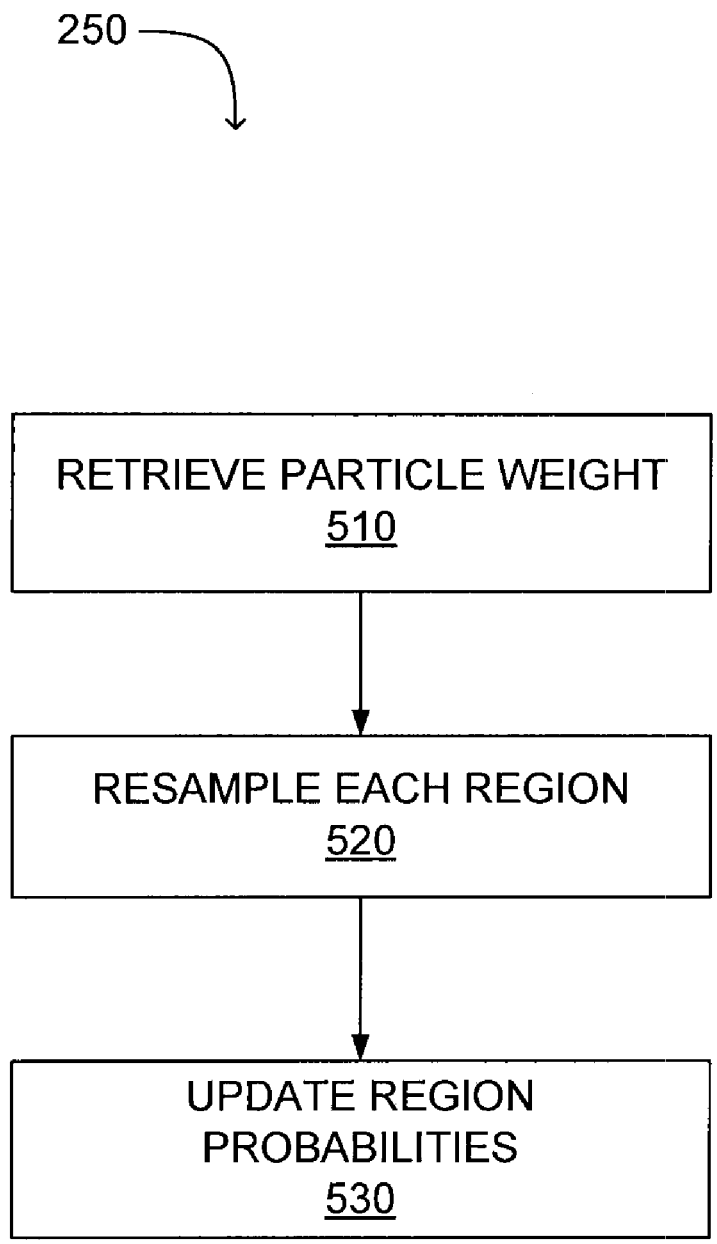
FIG. 5 is a flowchart illustrating a method for updating region probabilities based on entity location according to one embodiment of the present invention.

FIG. 5 a flowchart illustrating a method for updating 250 region probabilities based on entity location according to one embodiment of the invention. In an embodiment, one or more particle filters are used to track the posterior distribution of entity locations. However, because of latency induced by the image capture module 105, which may take up to 0.5 seconds to return a result, the one tracking module 146 or more particle filters are updated responsive to the availability of a new observation. By updating on a per-result scale, the availability of results provides a natural time scale for the Dynamic Bayesian Network used for entity tracking.

The weight of each particle is retrieved 510 from the observation module 144. When the observation module 144 applies the observation model as described in FIG. 4, the calculated probability of the entity being inside the visual field of the image capture device 105 or the calculated probability of the entity being outside the visual field of the image capture device 105 is used as the weight of the particle associated with the entity. Each region is then resampled 520 and the new data is used to update 530 the probabilities of the entity being in different regions sot that the total weight of a specific region equals the total weight of the probability of the particles included in the region. Hence, the probability mass of each region, which indicates the likelihood that the particle is in a region, is tightly controlled so that the probabilities of the particle being in a region are highly accurate.

In one embodiment, the regions are resampled 520 when the empirical variance of the particle weights within a region is below a fixed threshold, beneficially resampling 520 when the weights are concentrated on a small set of particles within the region. In one embodiment, the regions are resmapled 520 using a sequential stochastic process, such as the process described in "Probabilistic Robotics" by Sebastian Thrun et al., which is incorporated by reference herein in its entirety, rather than by individually generating each new particle. The sequential stochastic process initially generates a random number t in the range $[0, W^{-1}]$, where W is the total weight of a region. Hence, the set of samples correspond to the weights t, $t + W^{-1}$, $t + 2W^{-1}$, etc. Resampling 520 using the sequential stochastic process reduces the complexity of the resampling 520 from O(M log M) to O(M), where M denotes the number of particles.

The method for updating 250 region probabilities based on entity location according to one embodiment of the invention can be used to track multiple entities using separate particle filters for each entity. As the correlations between entity locations are induced by the position of the image capture device 105, the location of two entities are conditionally independent of each other given the history of the movement of the image capture device 105. Because the localization performed by the observation module 144, each particle associated with an entity includes the history of image capture device 105 movement, allowing separate particle filters to be used to track separate entities. By using separate particle filters, the dependence of particle filter size to number of entities is reduced from exponential to linear.

Figure 7:
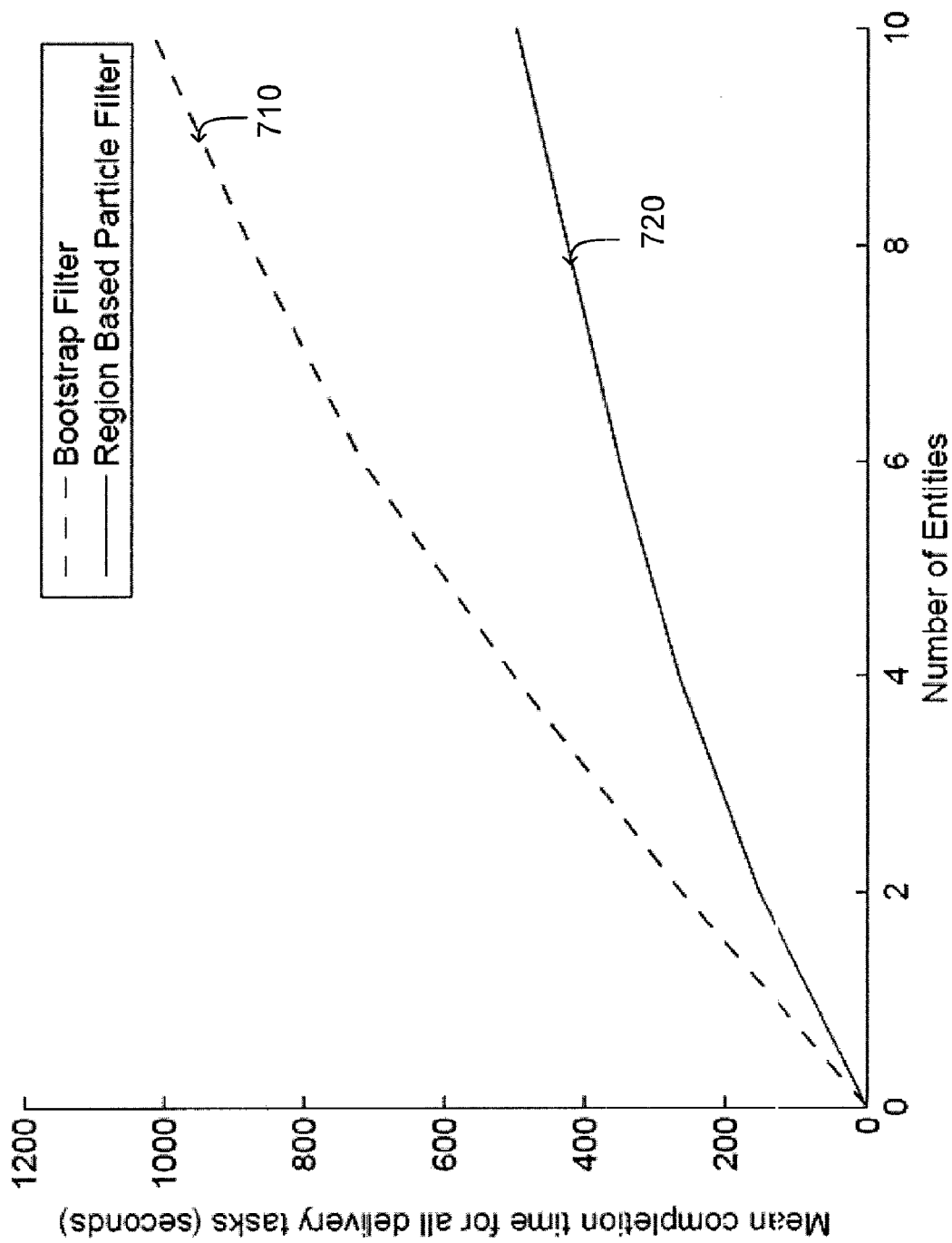
FIG. 7 is an illustration of the average completion time of automated delivery tasks according to one embodiment of the present invention.

FIG. 7 is an illustration of the average completion time of automated delivery tasks according to one embodiment of the present invention. Performance of the region-based particle filter is compared to a conventional bootstrap filter without region representation over 100 simulations of a multiple entity delivery task. FIG. 7 illustrates bootstrap filter performance 710 and region-based particle filter performance 720 by depicting the mean time to complete delivery tasks for all entities versus the number of entities. As shown in FIG. 7, the region-based particle filter completes delivery tasks in a shorter amount of time than the conventional bootstrap filter and the performance improvements afforded by the region-based particle filter are more pronounced as more entities are involved.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A system for tracking one or more entities comprising:
an image capture device for capturing image data describing an entity;
a region generation module for generating a plurality of discrete regions, each region including one or more positions and describing a probability distribution over all positions in a region for one or more entities of interest; and
an observation module coupled to the image capture device and the region generation module configured to, for each region:
generate a set of particles for the region, each particle associated with an entity within the region;
determine a weight associated with each particle, the weight describing a likelihood of observing the entity associated with the particle in the region; and
modify the probability distribution associated with the region responsive to the weight associated with each generated particle.

2. The system of claim 1, wherein the image capture device comprises a depth apparatus for capturing data describing a position of the entity and a vision apparatus for distinguishing the entity from one or more additional entities.

3. The system of claim 1, wherein the observation module localizes a direction and position of the image capture device using odometry and observation matching to find a set of data approximating a path taken by the image capture device.

4. The system of claim 1, further comprising:
a tracking module, coupled to the observation module, the tracking module for tracking the region-specific probabilities of observing the entity in each region responsive to receiving image data from the image capture device.

5. A method for tracking an entity through an environment, the method comprising the steps of:
generating a plurality of regions, each region including one or more positions and representing a location for the entity, wherein each region is associated with a probability distribution that the entity is located at a position from the one or more positions;
responsive to receiving data from an image capture device, generating a set of particles for each region, each particle associated with an entity within the region and the set of particles collectively representing a belief about the entity being included in a region;
determining a weight associated with each particle, the weight describing a likelihood of observing the entity associated with the particle in the region; and
modifying the probability distribution associated with each region responsive to the weight associated with each generated particle.

6. The method of claim 5, wherein the step of generating a plurality of regions comprises the steps of:
generating a plurality of regions, each region including one or more positions and a probability distribution that the entity is located at a position within the region;
generating a position transition model describing movement by the entity from a first position to a second position within a region; and
generating a region transition model describing movement by the entity from a first region to a second region.

7. The method of claim 6, wherein the position transition model comprises a Gaussian distribution having a two-dimensional mean vector and a covariance matrix, wherein the two-dimensional mean vector and the covariance matrix are generated from the region associated with the probability distribution.

8. The method of claim 5, wherein determining the weight associated with the generated particle comprises the steps of:
localizing an orientation associated with the image capture device; and
determining whether the entity is included in a visual field of the image capture device.

9. The method of claim 8, further comprising the steps of:
responsive to determining the entity is not included in the visual field of the image capture device:
determining an observation error probability distribution describing a probability of not observing the entity in the visual field of the image capture device; and
for a portion of the region within the visual field of the image capture device, calculating the probability of the entity not being observed in the visual field of the image capture device using the observation error probability.

10. The method of claim 8, further comprising the steps of:
responsive to determining the entity is included in the visual field of the image capture device:
extracting the coordinates of the entity from the image capture device;
determining a minimum observation error associated with the coordinates of the entity; and
calculating a probability of the entity being observed in the visual field of the image capture device, wherein probability of the entity being observed in the visual field of the image capture device is bounded by the minimum observation error.

11. A computer program product, comprising a computer readable storage medium storing computer instructions for tracking an entity through an environment, the computer instructions, when executed, performing the steps of:
generating a plurality of regions, each region including one or more positions and representing a location for the entity, wherein each region is associated with a probability distribution that the entity is located at a position from the one or more positions;

responsive to receiving data from an image capture device, generating a set of particles for each region, each particle associated with an entity within the region and the set of particles collectively representing a belief about the entity being included in a region;

determining a weight associated with each particle, the weight describing a likelihood of observing the entity associated with the particle in the region; and modifying the probability distribution associated with each region responsive to the weight associated with each generated particle.

12. The computer program product of claim 11, wherein the step of generating a plurality of regions comprises the steps of:

generating a plurality of regions, each region including one or more positions and a probability distribution that the entity is located at a position within the region;

generating a position transition model describing movement by the entity from a first position to a second position within a region; and generating a region transition model describing movement by the entity from a first region to a second region.

13. The computer program product of claim 12, wherein the position transition model comprises a Gaussian distribution having a two-dimensional mean vector and a covariance matrix.

14. The computer program product of claim 11, wherein determining the weight associated with the generated particle comprises the steps of:

localizing an orientation associated with the image capture device; and determining whether the entity is included in a visual field of the image capture device.

15. The computer program product of claim 14, further comprising the steps of:

responsive to determining the entity is not included in the visual field of the image capture device:

determining an observation error probability distribution describing a probability of not observing the entity in the visual field of the image capture device; and for a portion of the region within the visual field of the image capture device, calculating the probability of the entity not being observed in the visual field of the image capture device using the observation error probability.

16. The computer program product of claim 14, further comprising the steps of:

responsive to determining the entity is included in the visual field of the image capture device:

extracting the coordinates of the entity from the image capture device;

determining a minimum observation error associated with the coordinates of the entity; and calculating a probability of the entity being observed in the visual field of the image capture device, wherein probability of the entity being observed in the visual field of the image capture device is bounded by the minimum observation error.

\* \* \* \* \*